(12) United States Patent
Lee et al.

(10) Patent No.: US 7,270,466 B2
(45) Date of Patent: Sep. 18, 2007

(54) REFLECTOR FOR BACK LIGHT ASSEMBLY AND BACK LIGHT ASSEMBLY USING THE SAME

(75) Inventors: Jeong-hwan Lee, Suwon (KR); Byung-woong Han, Incheon (KR)

(73) Assignee: Samsung Electronics Co., Ltd. (KR)

( * ) Notice: Subject to any disclaimer, the term of this patent is extended or adjusted under 35 U.S.C. 154(b) by 113 days.

(21) Appl. No.: 10/705,591

(22) Filed: Nov. 10, 2003

(65) Prior Publication Data

US 2004/0228108 A1 Nov. 18, 2004

(30) Foreign Application Priority Data

Nov. 13, 2002 (KR) .................. 10-2002-0070513

(51) Int. Cl.
*F21V 7/04* (2006.01)

(52) U.S. Cl. .................. 362/625; 362/627; 349/61

(58) Field of Classification Search ............. 362/600, 362/606, 623–629; 349/56, 61–62, 65, 70
See application file for complete search history.

(56) References Cited

U.S. PATENT DOCUMENTS

| | | | | |
|---|---|---|---|---|
| 2,951,419 | A * | 9/1960 | Lemelson | 359/542 |
| 5,775,791 | A * | 7/1998 | Yoshikawa et al. | 362/625 |
| 6,683,720 | B2 | 1/2004 | Yoshida et al. | |
| 6,705,739 | B2 * | 3/2004 | Kuo | 362/26 |
| 6,724,529 | B2 * | 4/2004 | Sinkoff | 359/443 |
| 6,898,012 | B2 * | 5/2005 | Kaminsky et al. | 359/599 |
| 2003/0025852 | A1 * | 2/2003 | Ishitake | 349/62 |
| 2004/0021810 | A1 * | 2/2004 | Kawaguri et al. | 349/113 |

FOREIGN PATENT DOCUMENTS

| | | |
|---|---|---|
| JP | 02-181703 | 7/1990 |
| JP | 08-327807 | 12/1996 |
| JP | 2000-035515 | 2/2000 |
| JP | 2000-056137 | 2/2000 |
| JP | 2001-83507 | 3/2001 |
| JP | 2001-166306 | 6/2001 |
| JP | 2002-79605 | 3/2002 |
| JP | 2003-84110 | 3/2003 |
| JP | WO 03/032073 A1 * | 4/2003 |
| WO | WO 02/04858 | 1/2002 |

OTHER PUBLICATIONS

Office Action by Chinese Patent Office dated Jul. 29, 2005.
Office Action by Taiwanes Patent Office dated Jun. 21, 2005.

* cited by examiner

*Primary Examiner*—Sandra O'Shea
*Assistant Examiner*—Jason Moon Han
(74) *Attorney, Agent, or Firm*—Cantor Colburn LLP

(57) ABSTRACT

The present invention relates to a reflector for a back light assembly and a back light assembly using the same. A reflector for a back light assembly for use in an LCD device comprises a base film; a protrusion of elastic material provided on a surface of the base film; and a reflecting layer deposited on the base film and the elastic protrusion, for reflecting light. With this configuration, the back light assembly prevents damage or deformation due to friction or impact between a light guide plate and the reflector and enhances the brightness of an LCD device.

18 Claims, 4 Drawing Sheets

REFLECTOR FOR BACK LIGHT ASSEMBLY AND BACK LIGHT ASSEMBLY USING THE SAME

CROSS-REFERENCE TO RELATED APPLICATIONS

This application claims the benefit of Korean Patent Application No. 2002-070513, filed Nov. 13, 2002, in the Korean Intellectual Property Office, the disclosure of which is incorporated herein by reference.

BACKGROUND OF THE INVENTION

1. Field of the Invention

The present invention relates to a reflector for a back light assembly and a back light assembly using the same, and more particularly, to a back light assembly having a reflector which prevents deformation and enhances the brightness of an LCD device.

2. Description of the Related Art

A liquid crystal display (LCD) device employs the principle that a molecular arrangement of liquid crystal is varied when voltage is applied to the liquid crystal. The varied molecular arrangement causes double refraction, optical rotatory power, optical scattering, etc., thereby forming visible images. In other words, the LCD device displays images by controlling the intensity of light passing through the liquid crystal.

The LCD device needs a light source because the LCD device cannot emit light by itself. That is, a back light assembly is employed for lightening an LCD panel. The back light assembly may be classified into an edge type and a direct-down type according to the location of a lamp. Hereinafter, the back light assembly of the edge type will be described as an exemplary embodiment. Further, for the convenience of description, the direction to a reflector is referred to as "rear", and the direction to an LCD panel is referred to as "front".

To make an LCD device thinner and lighter and have high brightness and high efficiency, various technologies for a back light assembly have been developed. Particularly, to make an LCD device have high brightness and high efficiency, a back light assembly has been developed to include various optical sheets disposed in the front of a light guide plate.

FIG. 1 is an exploded perspective view of a conventional back light assembly. As shown therein, a conventional back light assembly 100 comprises a lamp unit 130 emitting light, a light guide plate 110 guiding the light from the lamp unit 130 uniformly, a reflector 170 disposed in the rear of the light guide plate 110 and reflecting the light arriving at the reflector 170 into the light guide plate 110, and an optical sheet layer 150 placed in front of the light guide plate 110.

The reflector 170 includes a base film 171 and a reflecting layer 175 deposited on the front face of the base film 171 for reflecting the light into the light guide plate 110. Herein, the reflecting layer 175 is generally formed by depositing silver (Ag) or applying a white film on the front surface of the base film 171.

The optical sheet layer 150 includes a diffuser to diffuse the light guided by the light guide plate 110 toward the LCD panel, a prism film to enhance the brightness of the LCD device, etc.

However, in the conventional back light assembly 100, the reflecting layer 175 of the reflector 170 and the surface of the light guide plate 110 facing the reflector 170 may be easily scratched or deformed because of friction or impact between the light guide plate 110 and the reflector 170, thereby decreasing the light transmission efficiency of the LCD device.

SUMMARY OF THE INVENTION

The present invention provides a reflector for a back light assembly and a back light assembly using the same, which prevents a light guide plate and a reflector from being damaged or deformed and enhances the brightness of an LCD device.

Other aspects and advantages of the invention will be set forth in the description below.

The foregoing and other aspects of the present invention are achieved by providing a reflector for a back light assembly for use in an LCD device, comprising a base film; a protrusion of elastic material provided on a surface of the base film; and a reflecting layer deposited on the base film and the elastic protrusion, for reflecting light.

According to an aspect of the invention, the protrusion is made of silicon resin.

According to an aspect of the invention, the protrusions are embossed on the base film, having a dotted pattern.

According to an aspect of the invention, on the rear surface of the base film, being opposite to the protrusions, is provided a deformation prevention part for preventing the base film from being deformed.

According to an aspect of the invention, the deformation prevention parts are embossed on the rear surface of the base film, having a dotted pattern.

According to another aspect of the present invention, the foregoing and other aspects may be achieved by providing a back light assembly for an LCD panel, comprising the above described reflector; a light guide plate disposed on the reflector; and a lamp unit disposed at a side of the light guide plate, for emitting light into the light guide plate.

According to an aspect of the invention, on the surface of the light guide plate facing the reflector is formed a plurality of prism teeth.

According to an aspect of the invention, the protrusion of the reflector has a diameter smaller than a pitch of the prism teeth of the light guide plate.

According to an aspect of the invention, an interval between the adjacent protrusions on the base film varies in inverse proportion to a distance between the protrusions and the lamp unit.

According to an aspect of the invention, the back light assembly further comprises an optical sheet layer disposed on the light guide plate and having a plurality of prism teeth on the surface thereof facing the light guide plate.

According to an aspect of the invention, the prism teeth of the light guide plate are arranged in a direction across the prism teeth of the optical sheet layer.

BRIEF DESCRIPTION OF THE DRAWINGS

These and other aspects and advantages of the present invention will become apparent and more readily appreciated from the following description of the embodiments, taken in conjunction with the accompany drawings of which.

DETAILED DESCRIPTION OF THE INVENTION

Figure 1:
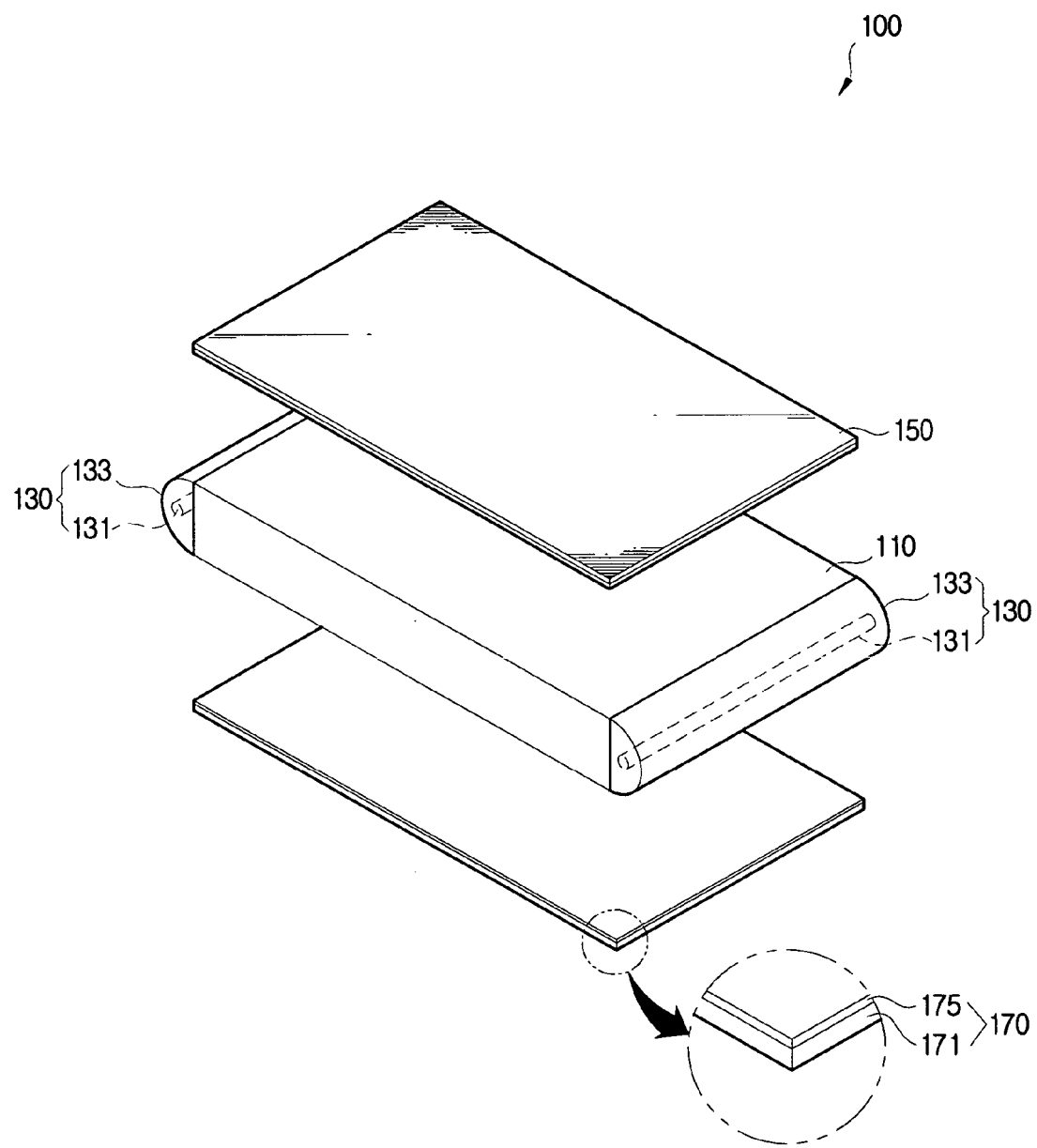
FIG. 1 is an exploded perspective view of a conventional back light assembly.

Reference will now be made in detail to the embodiments of the present invention, examples of which are illustrated in the accompanying drawings, wherein like reference numerals refer to like elements throughout. The embodiments are described below in order to explain the present invention by referring to the figures.

Typically, an LCD device comprises an LCD panel displaying images thereon, a back light assembly uniformly emitting light to the LCD panel, a supporting frame and chassis accommodating and supporting the LCD panel and the back light assembly.

The LCD panel includes a TFT (thin film transistor) substrate formed with switching elements and pixel grids, a color filter substrate, and a liquid crystal disposed between the TFT and color filter substrates. An electric signal including image data is transmitted to transistors of the TFT substrate through a data driver IC (integrated circuit) and a gate driver IC connected to the TFT substrate. Then, the liquid crystal is polarized by the electrical current and controls the intensity of light from the back light assembly, thereby forming a visible image.

The back light assembly typically includes a lamp unit employed as a light source, a light guide plate, an optical sheet layer, a reflector, etc.

Figure 2:
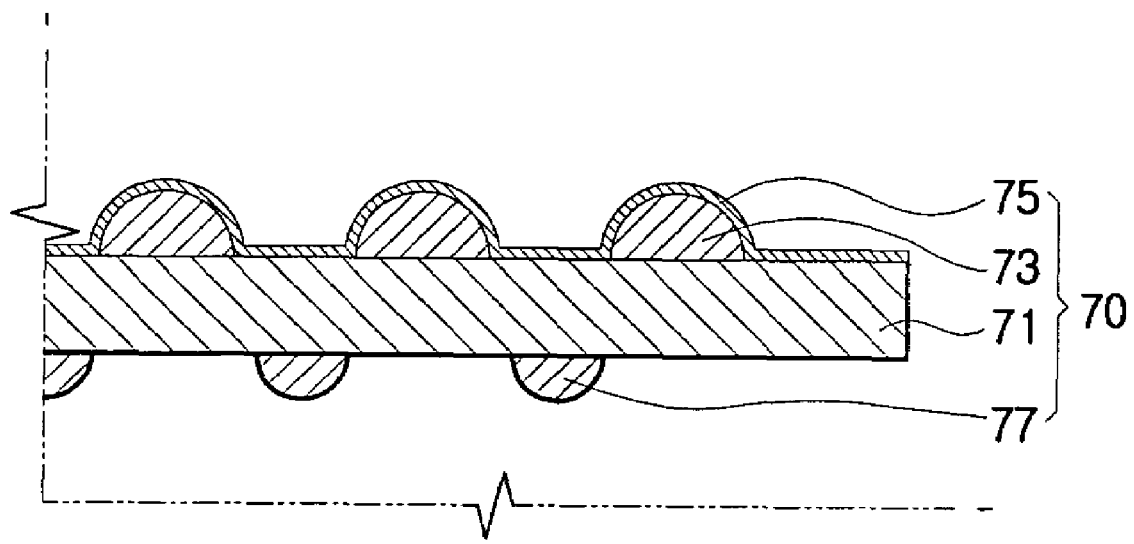
FIG. 2 is a sectional view of a reflector according to an exemplary embodiment of the present invention.

As shown in FIG. 2, a reflector 70 for the back light assembly according to the present invention comprises a base film 71, a plurality of protrusions 73 provided on the front surface of the base film 71, a reflecting layer 75 deposited on the front surfaces of the base film 71 and the protrusions 73. In this embodiment, the protrusions 73 are formed at scattered spots on the front surface, and the reflecting layer 75 is formed on the superficial surface of the respective protrusions 73 and the remaining surface of the base film 71 where no protrusion is formed. Also, for example, the protrusion 73 includes a bead.

The base film 71 has a planar shape and is a main part of the reflector 70. Herein, the base film 71 is, for example, made of PET (polyethylene-terephthalate).

The reflecting layer 75 is formed by depositing, for example, silver (Ag) on the front surfaces of the base film 71 and the protrusions 73, and reflects the light arriving at the reflecting layer 75 into a light guide plate 10 (to be described later, referring to FIGS. 3 and 4).

For example, the protrusions 73 are made of elastic material, and absorb an impact when the front surface of the reflector 70 comes in contact with the rear surface of the light guide plate 10. Thus, the rear surface of the light guide plate 10 is prevented from deformation and the reflecting layer 75 of the reflector 70 is prevented from a scratch. Herein, the protrusions 73 are, for example, made of silicon resin, although it may be made of other known elastic materials.

The protrusions 73 are formed by coating the front surface of the base film 71 with the dotted silicon resin to be embossed on the base film 71. Thus, the light directing backward is diffused and reflected by the reflecting layer 75 with the dotted protrusions 73, thereby enhancing the brightness of the LCD device.

Further, the rear surface of the base film 71 is provided with deformation prevention parts 77 preventing the base film 71 from deformation. When the base film 71 is coated with the protrusions 73, the front surface of the base film 71 may be deformed forward (for example, bent forward due to shrink effect on the coating of the protrusions). Therefore, the forward deformation of the base film 71 is compensated with the deformation prevention parts 77 coated on the rear surface of the base film 71. Herein, like the protrusions 73, the deformation prevention parts 77 are formed by coating the rear surface of the base film 71 with the dotted silicon resin to be embossed on the base film 71.

Figure 3:
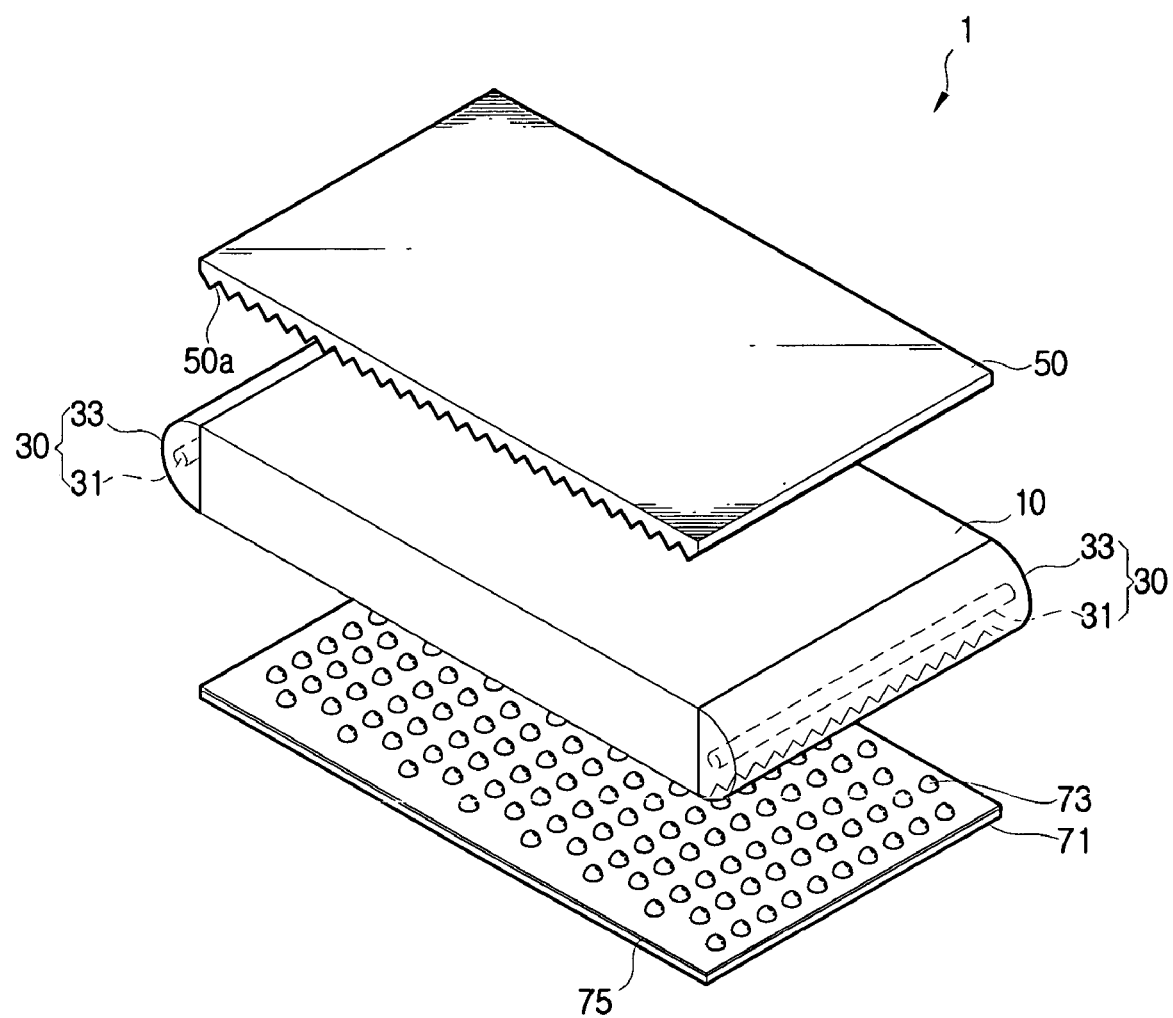
FIG. 3 is an exploded perspective view of a back light assembly according to an exemplary embodiment of the present invention.
Figure 4:
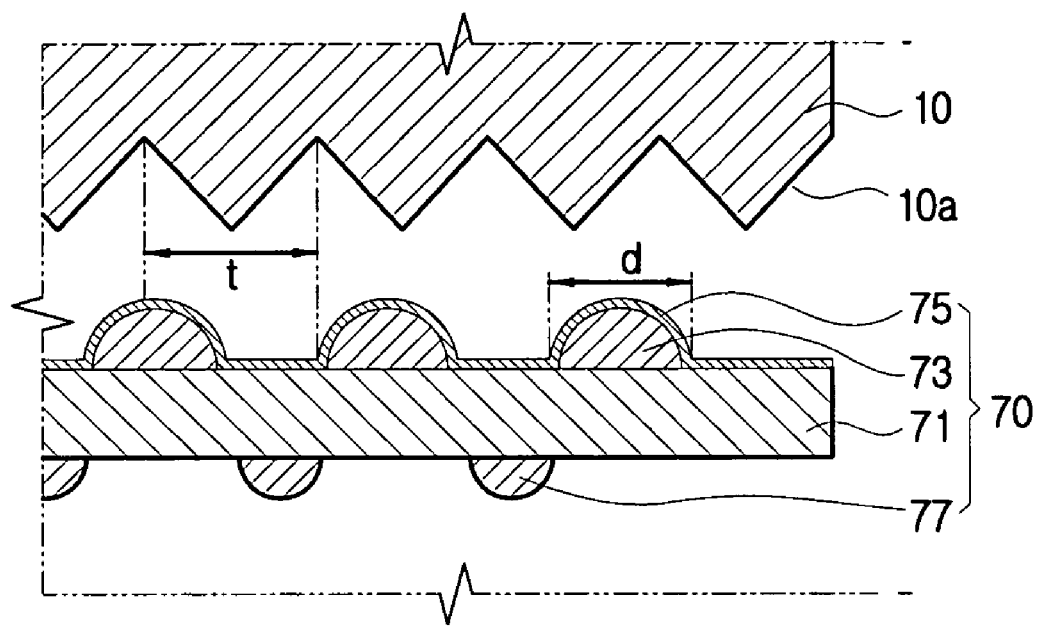
FIG. 4 is a sectional view illustrating the light guide plate and the reflector in FIG. 3.

FIG. 3 is an exploded perspective view of the back light assembly using the reflector of FIG. 2. As shown therein, a back light assembly 1 comprises a lamp unit 30 emitting light, the light guide plate 10 guiding the light from the lamp unit 30 uniformly, the reflector 70 placed in back of the light guide plate 10 and reflecting the light arriving at the reflector 70 into the light guide plate 10, and an optical sheet layer 50 placed in front of the light guide plate 10 and enhancing the brightness of the LCD panel.

The lamp unit 30 includes a lamp 31 emitting light, a lamp reflector 33 reflecting the light from the lamp 31 into the light guide plate 10.

On the rear surface of the light guide plate 10 facing the reflector 70 is formed a plurality of prism teeth 10a. Herein, the rear surface of the light guide plate 10 is corrugated to form the prism teeth 10a in a direction perpendicular to the longitudinal direction of the lamp 31. As a result, the light guide plate 10 is uniformly lightened, thereby enhancing the brightness of the LCD panel.

Further, on the rear surface of the optical sheet layer 50 facing the light guide plate 10 is formed a plurality of transverse prism teeth 50a. Herein, the rear surface of the optical sheet layer 50 is corrugated to form the transverse prism teeth 50a arranged in a direction across the prism teeth 10a of the light guide plate 10. The prism teeth 10a and the transverse prism teeth 50a allow the light to be propagated perpendicularly to the surface of the LCD panel, thereby enhancing the brightness of the LCD panel. Additionally, the optical sheet layer 50 may further include sheets to enhance the brightness of the LCD panel.

In this embodiment, the protrusion 73 of the reflector 70 may have a diameter smaller than a pitch of the prism teeth 10a of the light guide plate 10. That is, the diameter "r" (see FIG. 4) of the elastic protrusion 73 is smaller than the pitch "t" (see FIG. 4) of the prism teeth 10a of the light guide plate 10, thereby decreasing deformation of the prism teeth 10a due to the protrusion 73.

Further, for example, the protrusions 73 are closer to each other at the center area than at the marginal area of the base film 71. An interval between adjacent protrusions 73 varies depending on their location on the base film 71 in inverse proportion to the distance between the protrusions 73 and the lamp unit 30. That is, the protrusions 73 are more dense at the center area of the base film 71, so that the light emitted from the lamp 31 to the center of the light guide plate 10, i.e., propagated approximately parallel with the surface of the reflector 70, is effectively reflected into the light guide plate 10 by the dense protrusions 73.

In the back light assembly 1 according to the foregoing embodiment, on the rear surface of the light guide plate 10 is formed the plurality of prism teeth 10a. However, on the rear surface of the light guide plate 10 may be formed a plurality of corrugated parts having, for example, convex or concave shapes.

As described above, there are provided the base film 71, the protrusions 73 provided on the front surface of the base film 71, the reflecting layer 75 deposited on the front surfaces of the base film 71 and the protrusions 73, so that the prism parts 10a formed on the rear surface of the light guide plate 10 and the reflecting layer 75 formed on the front surface of the reflector 70 are prevented from being damaged or deformed.

Further, there are provided the dotted protrusions 73 formed on the base film 71, thereby enhancing the brightness of the LCD device.

As described above, the present invention provides a reflector for a back light assembly and a back light assembly using the same, which can prevent damage or deformation due to friction between a light guide plate and a reflector and can enhance the brightness of an LCD device.

Although a few embodiments of the present invention have been shown and described, it will be appreciated by those skilled in the art that changes may be made in these embodiments without departing from the principles and spirit of the invention, the scope of which is defined in the appended claims and their equivalents.

What is claimed is:

1. A reflector for a back light assembly for use in an LCD device, comprising:
    a base film;
    a protrusion provided on a first surface of the base film, the first surface being substantially flat;
    a plurality of deformation prevention parts suitable to prevent the base film from being deformed, the deformation prevention parts disposed on a second surface of the base film opposite to the first surface and spaced apart from each other; and
    a reflecting layer deposited on the first surface of the base film where no protrusion is formed and on the protrusion, for reflecting light generated from a lamp;
    wherein the protrusion partly covers the first surface of the base film and the reflecting layer contacts with the first surface of the base film.

2. The reflector according to claim 1, wherein the protrusion is made of elastic material.

3. The reflector according to claim 2, wherein the protrusion is made of silicon resin.

4. The reflector according to claim 1, wherein the protrusion is embossed on the base film.

5. The reflector according to claim 1, wherein the reflector includes a plurality of the protrusions having a dotted pattern.

6. The reflector according to claim 1, wherein the deformation prevention part is embossed on the second surface of the base film.

7. The reflector according to claim 1, wherein the reflector includes a plurality of the deformation prevention parts having a dotted pattern.

8. A back light assembly for an LCD panel, comprising: reflector comprising:
    a base film:
    a protrusion provided on a first surface of the base film, the first surface being substantially flat; a deformation prevention part for preventing the base film from being deformed, the deformation prevention part being formed on a second surface of the base film opposite to the first surface; and
    a reflecting layer deposited on the first surface of the base film where no protrusion is formed and on the protrusion, for reflecting light generated from a lamp;
    wherein the protrusion partly covers the first surface of the base film and the reflecting layer contacts with the first surface of the base film
    a light guide plate disposed on the reflector;
    a plurality of prism teeth formed on a surface of the light guide plate facing the reflector: and
    a lamp unit disposed at a side of the light guide plate, for emitting light into the light guide plate.

9. The back light assembly according to claim 8, wherein the protrusion is substantially a circular, spherical or cylindrical shape, the protrusion of the reflector having a diameter smaller than a pitch of the prism teeth of the light guide plate.

10. The back light assembly according to claim 8, wherein an interval between the adjacent protrusions on the base film varies in inverse proportion to a distance between the protrusions and the lamp unit.

11. The back light assembly according to claim 8, further comprising an optical sheet layer disposed on the light guide plate, the optical sheet layer having a plurality of prism teeth on a surface thereof facing the light guide plate.

12. The back light assembly according to claim 11, wherein the prism teeth of the light guide plate are arranged in a direction across the prism teeth of the optical sheet layer.

13. The back light assembly according to claim 9, further comprising a plurality of prism teeth formed on a surface of the light guide plate facing the reflector.

14. The back light assembly according to claim 13, wherein the protrusion is substantially circular, spherical or cylindrical shape, the protrusion of the reflector having a diameter smaller than a pitch of the prism teeth of the light guide plate.

15. The back light assembly according to claim 13, wherein an interval between the adjacent protrusions on the base film varies in inverse proportion to a distance between the protrusions and the lamp unit.

16. The back light assembly according to claim 13, further comprising an optical sheet layer disposed on the light guide plate, the optical sheet layer having a plurality of prism teeth on the surface thereof facing the light guide plate.

17. The back light assembly according to claim 16, wherein the prism teeth of the light guide plate are arranged in a direction across the prism teeth of the optical sheet layer.

18. The back light assembly according to claim 9, wherein the deformation prevention part is formed opposite to where no protrusion is formed.

* * * * *